United States Patent
Chakalian et al.

(10) Patent No.: US 8,601,214 B1
(45) Date of Patent: Dec. 3, 2013

(54) SYSTEM AND METHOD FOR WRITE-BACK CACHE IN SPARSE VOLUMES

(75) Inventors: Mardiros Z. Chakalian, San Jose, CA (US); Aswini S. Kumar, Fremont, CA (US); Darrell Suggs, Raleigh, NC (US)

(73) Assignee: NetApp, Inc., Sunnyvale, CA (US)

( * ) Notice: Subject to any disclaimer, the term of this patent is extended or adjusted under 35 U.S.C. 154(b) by 387 days.

(21) Appl. No.: 12/986,050

(22) Filed: Jan. 6, 2011

(51) Int. Cl.
 *G06F 12/00* (2006.01)
(52) U.S. Cl.
 USPC .......... 711/118; 711/114; 711/143; 711/156; 711/162
(58) Field of Classification Search
 None
 See application file for complete search history.

(56) References Cited

U.S. PATENT DOCUMENTS

| | | | |
|---|---|---|---|
| 7,266,665 B2 * | 9/2007 | Stanley et al. | 711/173 |
| 7,689,609 B2 | 3/2010 | Lango et al. | |
| 8,060,695 B1 * | 11/2011 | Lee et al. | 711/114 |
| 2002/0078371 A1 * | 6/2002 | Heilig et al. | 713/200 |
| 2007/0067562 A1 * | 3/2007 | Ohsaki et al. | 711/113 |
| 2011/0099343 A1 * | 4/2011 | Ozdemir | 711/162 |

OTHER PUBLICATIONS

Turner, M., "FlexCache Caching Architecture," NetApp Technical Report, pp. 1-13 (2009).

* cited by examiner

*Primary Examiner* — Shawn X Gu
(74) *Attorney, Agent, or Firm* — Perkins Coie LLP

(57) ABSTRACT

The techniques introduced here provide for a write-back sparse volume cache in a storage system. The write-back sparse volume cache is implemented by a first storage server that is connected to communicate with a second storage server that hosts the origin storage volume. The first storage server receives a write request from a client to write data to the origin storage volume. In response to receiving the write request, the first storage server writes the data to the sparse volume cache maintained by the first storage server and acknowledges to the client a successful write operation. The data is maintained in the sparse volume cache such that the presence of the data in the sparse volume cache is transparent to the client and subsequent requests for the written data are serviced by the first storage server from the sparse volume cache. The data can later be flushed to the origin storage volume.

30 Claims, 9 Drawing Sheets

SYSTEM AND METHOD FOR WRITE-BACK CACHE IN SPARSE VOLUMES

FIELD OF THE INVENTION

At least one embodiment of the present invention pertains to sparse volume caching, and more particularly, to write-back caching using sparse volumes in a storage system.

BACKGROUND

A storage controller is a physical processing device that is used to store and retrieve data on behalf of one or more hosts. A network storage controller can be configured (e.g., by hardware, software, firmware, or any combination thereof) to operate as a storage server that serves one or more clients on a network, to store and manage data in a set of mass storage devices, such as magnetic or optical storage-based disks, tapes, or flash memory. Storage of data in the set of mass storage devices can be implemented as one or more storage volumes defining an overall logical arrangement of disk space. Some storage servers are designed to service file-level requests from hosts, as is commonly the case with file servers used in a network attached storage (NAS) environment. Other storage servers are designed to service block-level requests from hosts, as with storage servers used in a storage area network (SAN) environment. Still other storage servers are capable of servicing both file-level requests and block-level requests, as is the case with certain storage servers made by NetApp®, Inc. of Sunnyvale, Calif., employing the Data ONTAP® storage operating system.

Large data farms including multiple storage servers, where each storage server has multiple volumes of data, can be invaluable in environments where many applications and users from multiple locations access data stored on the volumes. However, as these data farms grow larger, system throughput can be decreased when a large number of applications or users are accessing the same data set on a particular storage volume (the origin storage volume), because the overall system throughput is limited by the throughput of the storage server hosting the origin storage volume. In addition to limited throughput, overall system performance may be further limited by network latency between a client and the storage server.

One solution to these limitations has been to fully replicate the origin storage volume on other storage systems so that the data set is available in multiple locations. However, full replication of large data sets can be expensive and hard to manage. Another, more reasonable solution is to use sparse volumes to cache the most frequently or most recently used files on high performance storage systems. A sparse volume is a volume that appears to users and applications to be a replication of the origin storage volume, but does not contain all of the data from the origin storage volume.

In a conventional storage system implementing sparse volumes, the sparse volumes are a write-through cache, meaning user data is not written to the sparse volume but directly to the origin storage volume. The write-through sparse volume implementation limits the effectiveness of a sparse volume cache for write heavy data sets. While sparse volumes are a good solution for read-only or "read-mostly" data sets, high write latencies and low write throughput make sparse volumes less economical for write-heavy data sets. This is particularly true where the sparse volume and the origin storage volume are separated by a high latency wide area network.

SUMMARY

The techniques introduced here provide for a write-back sparse volume cache in a storage system. In one embodiment, the write-back sparse volume cache is implemented by a first storage server that is connected to communicate with a second storage server that hosts the origin storage volume. The first storage server receives a write request from a client to write data to the origin storage volume. In response to receiving the write request, the first storage server writes the data to the sparse volume cache maintained by the first storage server and acknowledges to the client a successful write operation. The data is maintained in the sparse volume cache such that the existence of the sparse volume cache is transparent to the client and subsequent requests for the data are serviced by the first storage server from the sparse volume cache.

The techniques introduced here further provide for maintaining a transaction log, for example, a data structure on the sparse volume, of the data that has been written to the sparse volume cache as a record of data to be written to the origin storage volume. In response to a defined event, the first storage system that maintains the sparse volume cache sends, or "flushes", the data to the second storage server where the data is written to the origin storage volume. The first storage server can further increase write efficiency by coalescing and collapsing the transaction log in order to reduce the number of write transactions that are sent to the second storage system.

Storing the data in the sparse volume cache and acknowledging a successful write to the client before the data has been flushed to the origin storage volume decreases the write latency and increases the write throughput capacity of storage systems that implement sparse volumes. This is because the latency and low throughput associated with the conventional write-through method are significantly reduced if not eliminated by storing the data in the sparse volume cache.

Other aspects of the techniques summarized above will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1A:
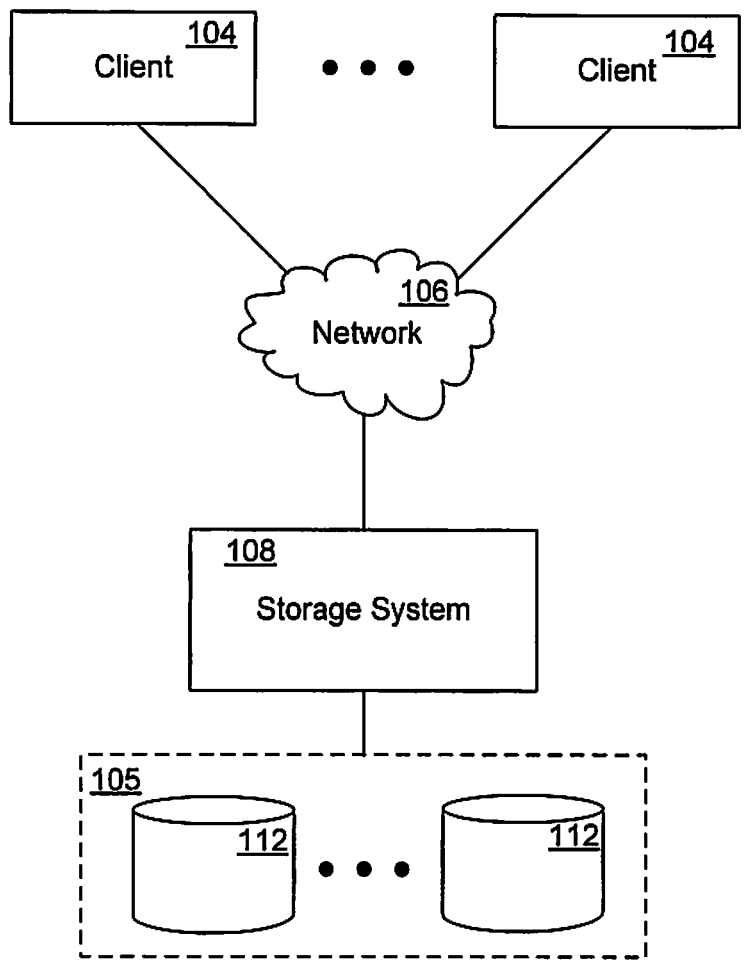
FIG. 1A shows an example of a network storage system.

FIG. 1A shows an example of a network storage system, which includes a plurality of client systems 104, a storage server 108, and a network 106 connecting the client servers 104 and the storage server 108. As shown in FIG. 1, the storage server 108 is coupled with a number of mass storage devices 112, such as disks, in a mass storage subsystem 105. Alternatively, some or all of the mass storage devices 112 can be other types of storage, such as flash memory, solid-state drives (SSDs), tape storage, etc. However, for ease of description, the storage devices 112 are assumed to be disks herein.

The storage server 108 can be, for example, one of the FAS-series of storage server products available from NetApp®, Inc. The client systems 104 are connected to the storage server 108 via the network 106, which can be a packet-switched network, for example, a local area network (LAN) or wide area network (WAN). Further, the storage server 108 can be connected to the disks 112 via a switching fabric (not shown), which can be a fiber distributed data interface (FDDI) network, for example. It is noted that, within the network data storage environment, any other suitable number of storage servers and/or mass storage devices, and/ or any other suitable network technologies, may be employed.

The storage server 108 can make some or all of the storage space on the disk(s) 112 available to the client systems 104 in a conventional manner. For example, each of the disks 112 can be implemented as an individual disk, multiple disks (e.g., a RAID group) or any other suitable mass storage device(s). Storage of information in the mass storage subsystem 105 can be implemented as one or more storage volumes that comprise a collection of physical storage disks 112 cooperating to define an overall logical arrangement of volume block number (VBN) space on the volume(s). Each logical volume is generally, although not necessarily, associated with its own file system.

The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used according to the techniques described herein. One or more RAID groups together form an aggregate. An aggregate can contain one or more volumes.

Figure 1B:
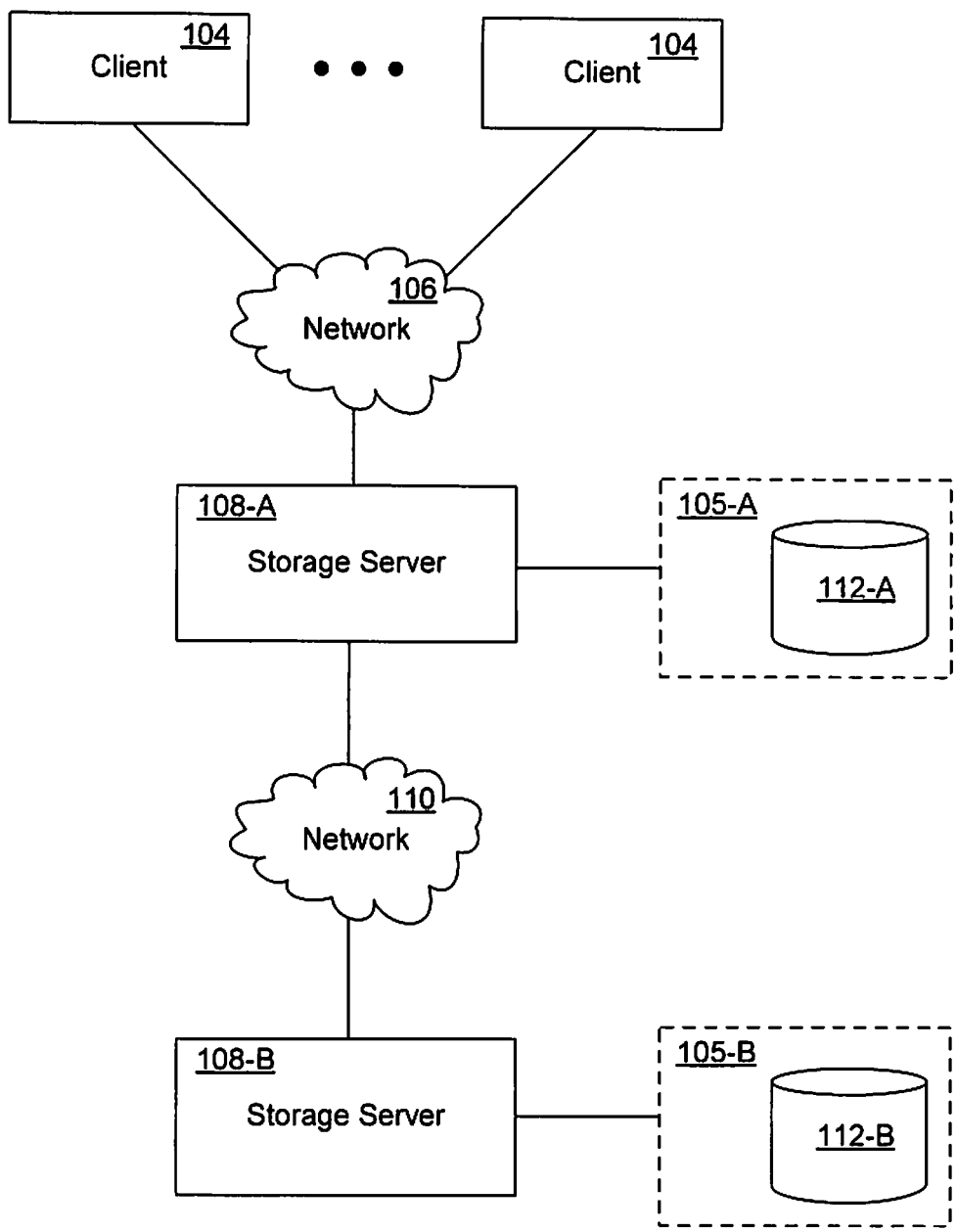
FIG. 1B shows an example of multiple network storage systems configured to communicate through a network.

As illustrated in FIG. 1B, two storage servers, 108-A and 108-B, are operatively interconnected with a network 110, such as a LAN, WAN, or a global area network such as the Internet. The storage server 108-B may be configured as a central data repository, a remote backing store or, a nearline storage server, for example. The storage servers 108-A and 108-B generally comprise hardware similar to storage server 108. However, storage server 108-B may alternatively execute a modified storage operating system that adapts the storage server for use as a nearline storage server.

Figure 2:
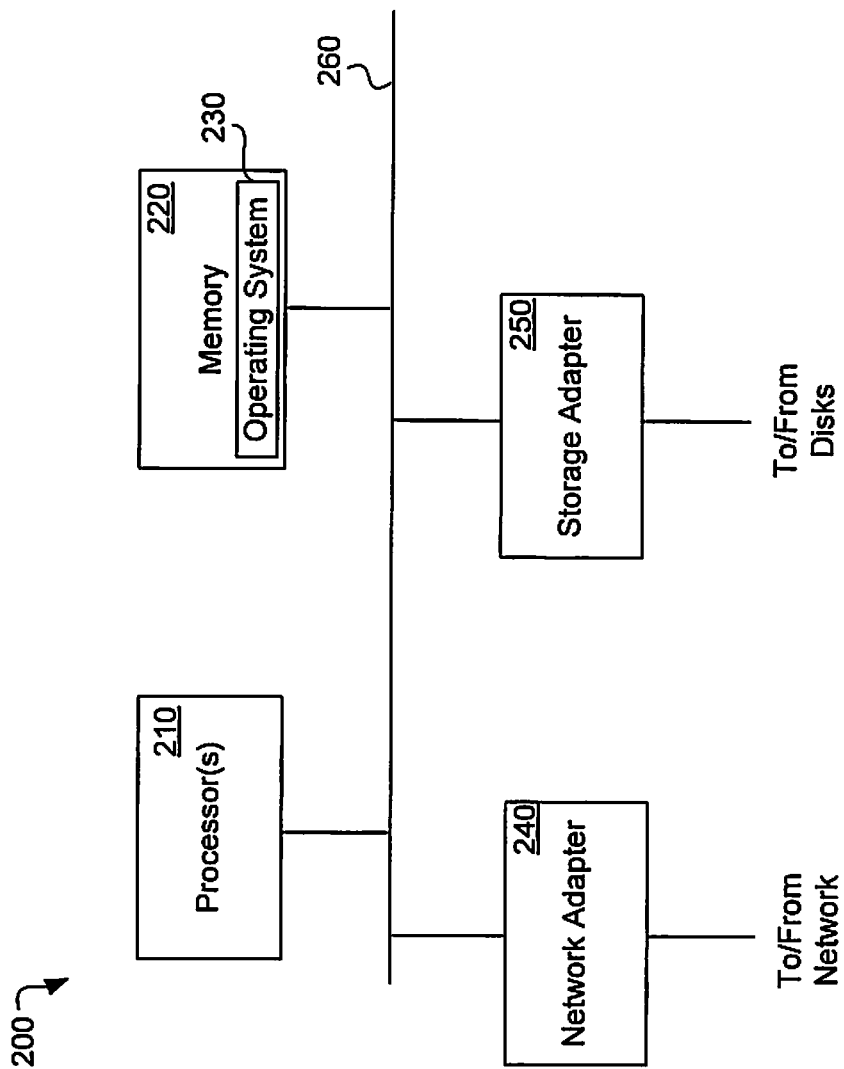
FIG. 2 is a diagram illustrating an example of a storage controller that can implement one or more network storage servers.

FIG. 2 is a diagram illustrating an example of the hardware architecture of a storage controller that can implement one or more network storage servers, for example, storage server 108 of FIG. 1A. The storage server is a processing system that provides storage service relating to the organization of information on storage devices, such as disks 112 of the mass storage subsystem 105. In an illustrative embodiment, the storage server 108 includes a processor subsystem 210 that includes one or more processors. The storage server 108 further includes a memory 220, a network adapter 240, and a storage adapter 250, all interconnected by an interconnect 260.

The storage server 108 can be embodied as a single- or multi-processor storage server executing a storage operating system 230 that preferably implements a high-level module, called a storage manager, to logically organize data as a hierarchical structure of named directories, files, and special types of files called virtual disks (hereinafter "blocks") on the disks 112.

The memory 220 illustratively comprises storage locations that are addressable by the processor(s) 210 and adapters 240 and 250 for storing software program code and data associated with the techniques introduced here. The processor 210 and adapters may, in turn, comprise processing elements and/ or logic circuitry configured to execute the software code and manipulate the data structures. The storage operating system 230, portions of which are typically resident in memory and executed by the processing elements, functionally organizes the storage server 108 by (among other things) invoking storage operations in support of the storage service provided by the storage server 108. It will be apparent to those skilled in the art that other processing and memory implementations, including various computer readable storage media, may be used for storing and executing program instructions pertaining to the techniques introduced here.

The network adapter 240 includes a plurality of ports to couple the storage server 108 with one or more clients 104, or other storage servers, over point-to-point links, wide area networks, virtual private networks implemented over a public network (Internet) or a shared local area network. The network adapter 240 thus can include the mechanical components as well as the electrical and signaling circuitry needed to connect the storage server 108 to the network 106. Illustratively, the network 106 can be embodied as an Ethernet network or a Fibre Channel network. Each client 104 can communicate with the storage server 108 over the network 106 by exchanging packets or frames of data according to pre-defined protocols, such as Transmission Control Protocol/Internet Protocol (TCP/IP).

The storage adapter 250 cooperates with the storage operating system 230 to access information requested by the clients 104. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. However, as illustratively described herein, the information is stored on disks 112. The storage adapter 250 includes a plurality of ports having input/output (I/O) interface circuitry that couples with the disks over an I/O interconnect arrangement, such as a conventional high-performance, Fibre Channel link topology.

The storage operating system 230 facilitates clients' access to data stored on the disks 112. In certain embodiments, the storage operating system 230 implements a write-anywhere file system that cooperates with one or more virtualization modules to "virtualize" the storage space provided by disks 112. In certain embodiments, a storage manager 310 (FIG. 3) element of the storage operation system 230 logically organizes the information as a hierarchical structure of named directories and files on the disks 112. Each "on-disk" file may be implemented as a set of disk blocks configured to store information. As used herein, the term "file" means any logical container of data. The virtualization module(s) may allow the storage manager 310 to further logically organize information as a hierarchical structure of blocks on the disks that are exported as named logical unit numbers (LUNs).

Figure 3:
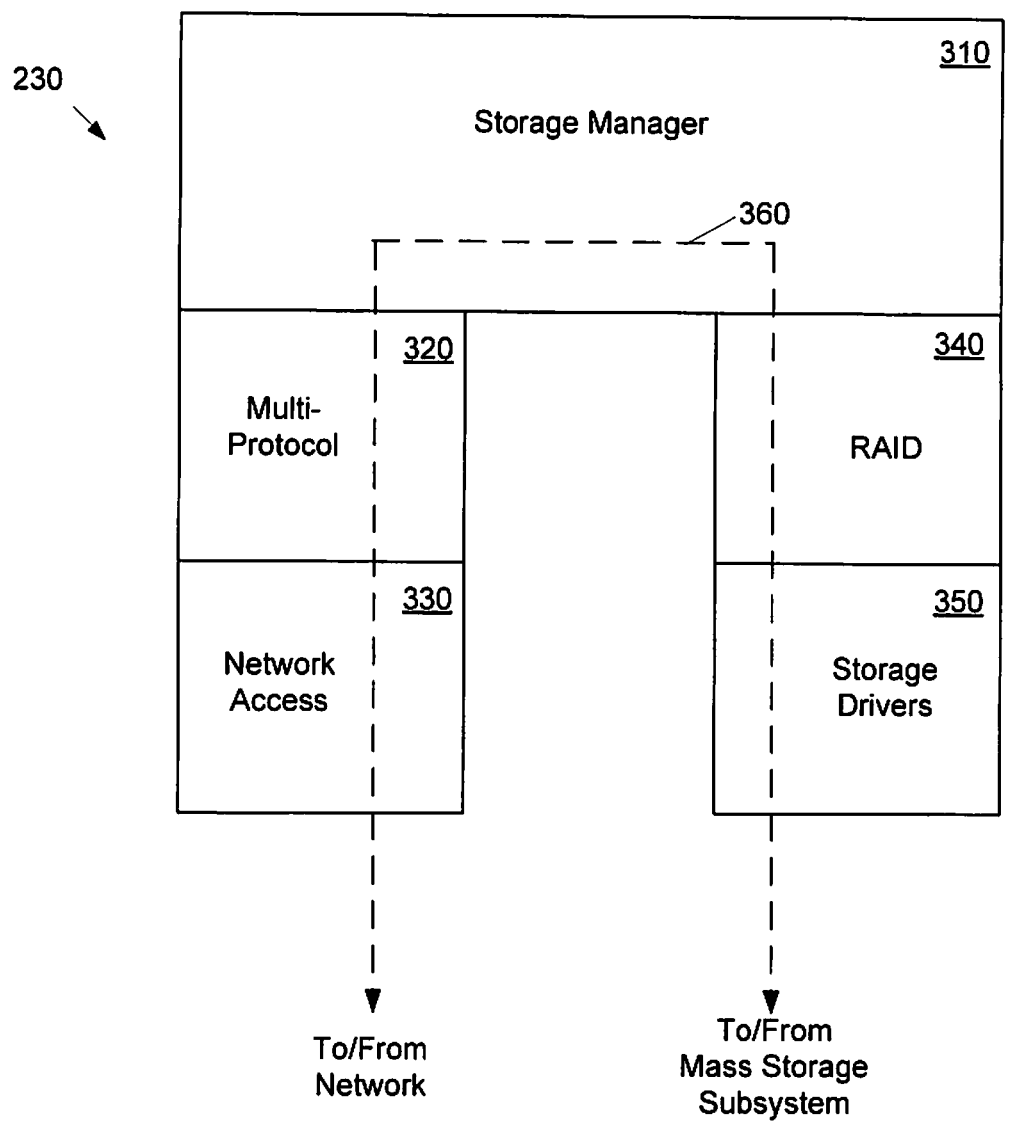
FIG. 3 schematically illustrates an example of the architecture of a storage operating system in a storage server.

FIG. 3 schematically illustrates an example of the architecture of a storage operating system 230 for use in a storage server 108. In one embodiment, the storage operating system 230 can be the NetApp® Data ONTAP™ operating system available from Network Appliance, Inc., Sunnyvale, Calif. that implements a Write Anywhere File Layout (WAFL™) file system. However, another storage operating system may alternatively be designed or enhanced for use in accordance with the techniques described herein.

The storage operating system 230 can be implemented as programmable circuitry programmed with software and/or firmware, or as specially designed non-programmable circuitry (i.e., hardware), or in a combination thereof. In the illustrated embodiment, the storage operating system 230 includes several modules, or layers. These layers include a storage manager 310, which is the core functional element of the storage operating system 230. The storage manager 310 imposes a structure (e.g., one or more file systems) on the data managed by the storage server 108 and services read and write requests from clients 104.

To allow the storage server to communicate over the network 106 (e.g., with clients 104), the storage operating system 230 also includes a multi-protocol layer 320 and a network access layer 330, logically under the storage manager 310. The multi-protocol layer 320 implements various higher-level network protocols, such as Network File System (NFS), Common Internet File System (CIFS), Hypertext Transfer Protocol (HTTP), Internet small computer system interface (iSCSI), NetApp Remote Volume (NRV), and/or backup/mirroring protocols to make data stored on the disks 112 available to users and/or application programs. The network access layer 330 includes one or more network drivers that implement one or more lower-level protocols to communicate over the network, such as Ethernet, Internet Protocol (IP), TCP/IP, Fibre Channel Protocol and/or User Datagram Protocol/Internet Protocol (UDP/IP).

Also, to allow the device to communicate with a storage subsystem (e.g., storage subsystem 105), the storage operating system 230 includes a storage access layer 340 and an associated storage driver layer 350 logically under the storage manager 310. The storage access layer 340 implements a higher-level storage redundancy algorithm, such as RAID-4, RAID-5 or RAID DP®. The storage driver layer 350 implements a lower-level storage device access protocol, such as Fibre Channel Protocol or small computer system interface (SCSI).

Also shown in FIG. 3 is the path 360 of data flow through the storage operating system 230, associated with a read or write operation, from the client interface to the storage interface. Thus, the storage manager 310 accesses the storage subsystem 105 through the storage access layer 340 and the storage driver layer 350. Clients 104 can interact with the storage server 108 in accordance with a client/server model of information delivery. That is, the client 104 requests the services of the storage server 108, and the storage server may return the results of the services requested by the client, by exchanging packets over the network 106. The clients may issue packets including file-based access protocols, such as CIFS or NFS, over TCP/IP when accessing information in the form of files and directories. Alternatively, the clients may issue packets including block-based access protocols, such as iSCSI and SCSI, when accessing information in the form of blocks.

In one embodiment, the storage manager 310 implements a message-based file system that provides logical volume management capabilities for use in access to the information stored on the storage devices, such as disks 112. That is, in addition to providing file system semantics, the storage manager 310 provides functions normally associated with a volume manager. These functions include: (i) aggregation of the disks, (ii) aggregation of storage bandwidth of the disks, and (iii) reliability guarantees, such as mirroring and/or parity (RAID). The storage manager 310 can implement the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Operationally, a request from the client 104 is forwarded as a packet over the computer network 106 and onto the storage server 108 where it is received at the network adapter 240. A network driver (of layer 330) processes the packet and, if appropriate, passes it on to a network protocol and file access layer for additional processing prior to forwarding to the storage manager 310. Here, the storage manager generates operations to load (retrieve) the requested data from disk 112 if it is not resident "in core", i.e., in the memory 220. If the information is not in the memory 220, the storage manager 310 indexes into the inode file using the inode number to access an appropriate entry and retrieve a logical VBN. The storage manager then passes a message structure including the logical VBN to the RAID system 340; the logical VBN is mapped to a disk identifier and disk block number and sent to an appropriate driver (e.g., SCSI) of the disk driver system 350. The disk driver accesses the disk block number from the specified disk 112 and loads the requested data block(s) in memory 220 for processing by the storage server. Upon completion of the request, the storage server (and operating system) returns a reply to the client 104 over the network 106.

Figure 4:
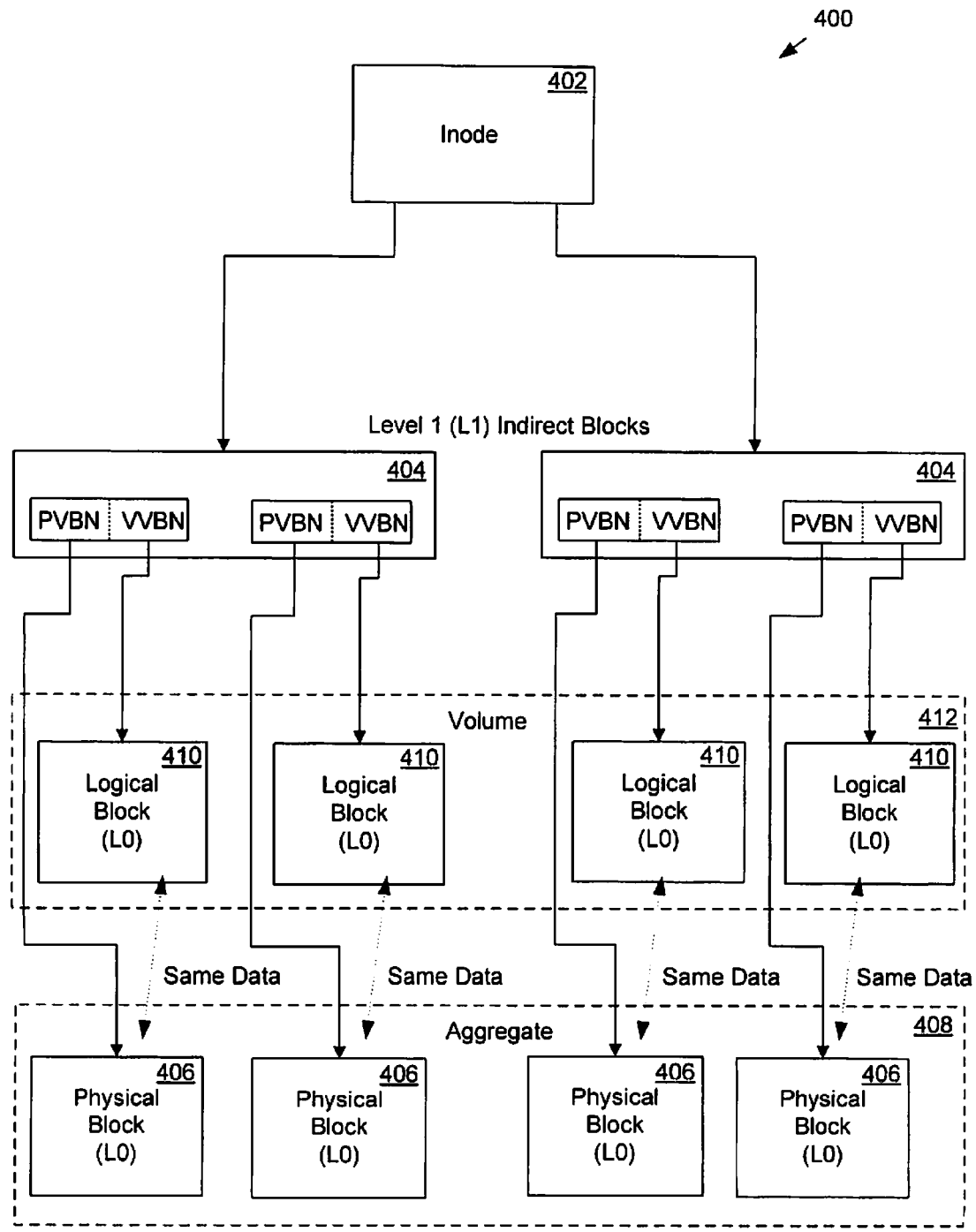
FIG. 4 is a block diagram representation of a buffer tree for a file.

FIG. 4 is a block diagram representation of a buffer tree 400 for a file. The file is assigned an inode 402, which references, for example using a pointer, Level 1 (L1) indirect blocks 404. Each indirect block 404 stores at least one physical volume block number (PVBN) and a corresponding virtual volume block number (VVBN) for each PVBN. There is a one-to-one mapping between each VVBN and PVBN. Note that a VVBN is a logical block number in a volume, which is a virtual number for addressing, but there is only one copy of the L0 data block physically stored. Also, to simplify description, only two PVBN-WBN pairs are shown in each indirect block 404 in FIG. 4. However, an actual implementation would likely include many PVBN-WBN pairs in each indirect block 404. Each PVBN references a physical block 406 in a storage device (i.e., in the aggregate 408) and the corresponding VVBN represents the corresponding logical block 410 in a file that represents the volume (called the "container file") 412. Physical blocks 406 and logical blocks 410 are actually the same L0 data for any particular PVBN-WBN pair, however, they are accessed in different ways. The PVBN is accessed directly in the aggregate 408, while the VVBN is accessed virtually via the volume container file 412. Note that there may be additional levels of indirect blocks (e.g., level 2, level 3) depending upon the size of the file.

A sparse volume is a volume that appears to users and applications to be a replication of an origin storage volume, but does not store all of the data from the origin storage volume. A sparse volume is identified by a special marking of an on-disk structure of the volume to denote the inclusion of one or more absent blocks. Illustratively, a pointer may contain a special predetermined value to signify that the object (e.g., an indirect block or data block) referenced by the pointer is not locally stored (e.g., on the sparse volume) and, thus, must be fetched (retrieved) from the origin storage volume. In the illustrative embodiment, the storage server 108-A, which hosts the sparse volume, reads each pointer and, if a requested block is absent (as indicated by the pointer having the special predetermined value), initiates transmission of an appropriate request (e.g., a remote fetch operation) for the data to storage server 108-B, which hosts the origin storage volume. This request can be sent, for example, using the NetApp Remote Volume (NRV) protocol. The special predetermined value is called ABSENT herein to facilitate description.

In a conventional storage system which implements a sparse volume cache, writes from client applications 104 are passed directly through the sparse volume cache to the origin storage volume. This means that the data is only written to the origin storage volume. In response to the data being written to the origin storage volume, the storage server that hosts the origin storage volume sends an acknowledgement to the storage server that hosts the sparse volume cache. Only after the storage server that hosts the sparse volume cache has received this acknowledgement does the storage server acknowledge to the client that the data has been written. Thus, conventionally a sparse volume is a write-through cache. According to the techniques introduced here, and described in more detail below, a sparse volume cache implements a write-back cache, which responds to the client with a write acknowledgement before verifying that the data is written to the origin storage volume, in order to reduce write latency associated with a conventional sparse volume.

Figure 5:
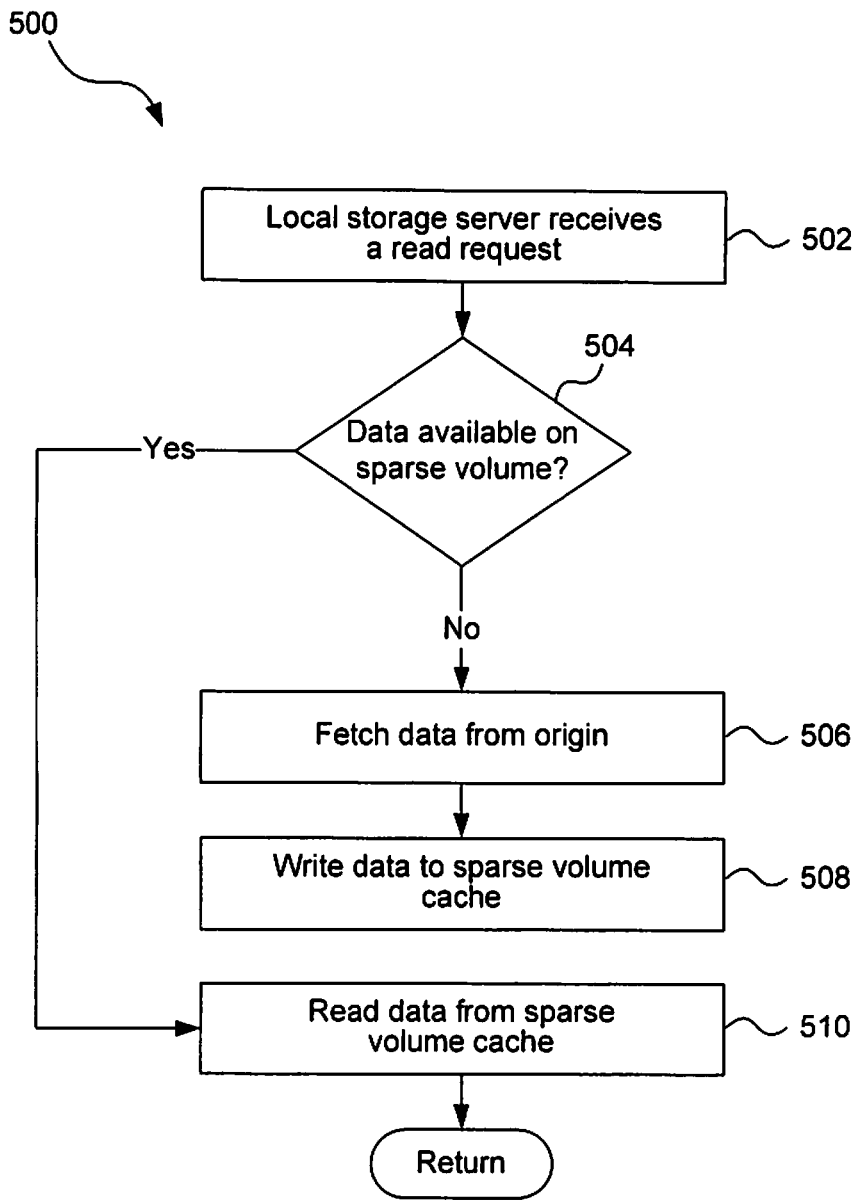
FIG. 5 is a flow diagram of a process for reading data in a storage system that implements a sparse volume cache.

FIG. 5 is a flow diagram of a process 500 for reading data in a storage system that implements a sparse volume cache. It should be understood that at least some of the operations associated with this process can potentially be reordered, supplemented, or substituted for, while still performing the same overall technique. The process begins at step 502 with the storage server that maintains the sparse volume cache, for example storage server 108-A, receiving a request from a client 104 for data associated with an inode on the origin storage volume. In response to a data access request, the storage manager 310 of storage server 108-A determines, at decision step 504, whether the data associated with that inode is available on the sparse volume by referencing the pointers in the inode.

Appropriate block pointers of the file are marked with the special ABSENT value to identify that the corresponding blocks, including data and/or indirect blocks, within the sparse volume are not physically located on the storage system serving the sparse volume, i.e., storage server 108-A. The special value further alerts the storage server 108-A that the data is to be obtained from the origin storage volume hosted, for example, on storage server 108-B. In response to a data access request, the storage manager 310 of storage server 108-A detects whether an appropriate block pointer of a file is set to ABSENT. If the block pointer for a requested file is not set to ABSENT, i.e., the data is available on the local storage 112-A, the storage server 108-A processes the data request from the local storage 112-A at step 510.

If, at decision step 504, the storage manager 310 of storage server 108-A determines that the block pointer for a requested file is set to ABSENT, at step 506, the storage server 108-A transmits a remote fetch (e.g., read) operation to the storage server 108-B to fetch the required data from the origin storage volume. The fetch operation requests one or more blocks of the file stored on the origin storage volume hosted by storage server 108-B. Storage server 108-B retrieves the requested data from the origin storage volume on its storage devices 112-B and returns the requested data to storage server 108-A, which processes the data access request and stores the returned data in its memory. Subsequently, at step 508, the storage server 108-A writes the data stored in memory to local storage (e.g., disk 112-A). In accordance with an illustrative write anywhere policy of the procedure, the storage manager 310 of storage server 108-A assigns pointer values (other than ABSENT) to indirect block(s) of the file to thereby identify location(s) of the data stored within the sparse volume. Thus, the remote fetch operation is no longer needed to access the data.

Figure 6:
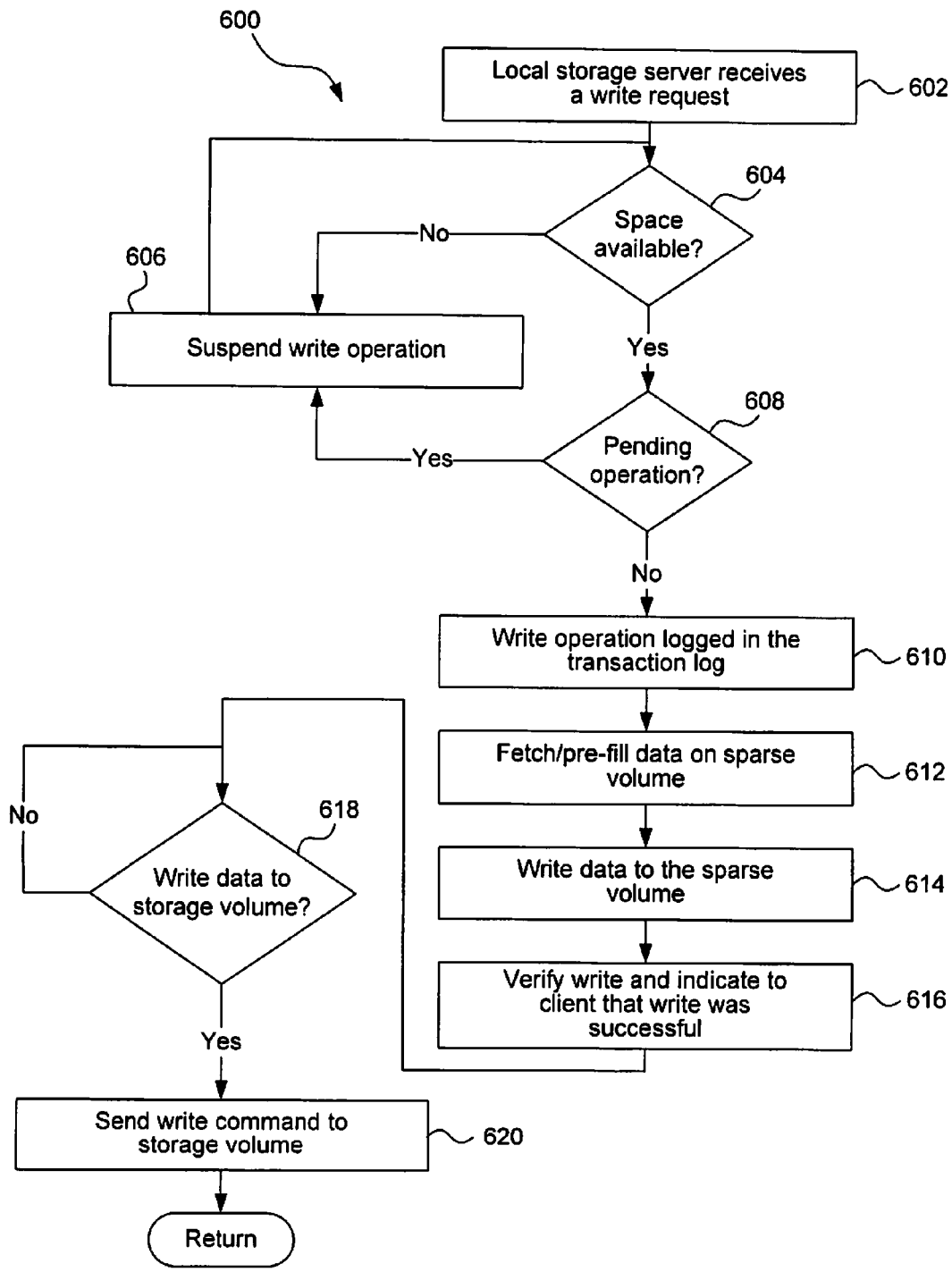
FIG. 6 is a flow diagram of a process for writing data in a storage system that implements a sparse volume cache.

FIG. 6 is a flow diagram of a process 600 for writing data in a storage system that implements a sparse volume cache. It should be understood that at least some of the operations associated with this process can potentially be reordered, supplemented, or substituted for, while still performing the same overall technique. In a typical sparse volume system, a write to a file in a sparse volume is performed by the storage server managing the sparse volume, for example, storage server 108-A, using a write-through process to the origin storage volume, as described above. In a write-through process, when the data is written to the origin storage volume, the storage server 108-A invalidates the corresponding blocks of the file in the sparse volume cache, i.e., the storage server 108-A sets the pointer in the inode of the file to the ABSENT value, such that at the next read request the data would be re-fetched from the origin storage volume. In one embodiment, the storage server 108-A invalidates the entire file in the sparse volume.

In contrast, according to the techniques introduced here, the storage server 108-A writes the data to the sparse volume cache as described in the example flow of FIG. 6. The process begins at step 602 where the storage server 108-A receives a write request from a client 104. In response to receiving the write request, the storage server 108-A hosting the sparse volume cache, at decision step 604, checks to determine whether there is storage capacity available to write the data to the sparse volume cache. The sparse volume can run out of storage space before the origin storage volume does, because typically the sparse volume has a smaller physical capacity than its corresponding origin storage volume. In one embodiment, a limited number of writes can be cached before a write to the origin storage volume is triggered. If the sparse volume does not have storage capacity available, the process continues to step 606 where the storage server 108-A suspends the write operation until there is sufficient capacity to perform the operation. In one embodiment, a "flush" operation, as described below with respect to step 616 can be triggered to free up space on the sparse volume. In another embodiment, data blocks on the sparse volume that are read cached (i.e., not pending a write to the origin storage volume), can be released to free up space for the write request.

The storage server 108-A also checks to determine whether there is space available in a transaction log to add an entry for the write. The transaction log is described below with reference to FIG. 7A. In one embodiment, the transaction log can maintain a limited number of entries. If the transaction log is full, data written to the sparse volume can be flushed to the origin storage volume and the corresponding entry removed from the transaction log.

If there is storage capacity available to store the write request in the sparse volume cache, the storage server 108-A checks a pending operation table, or other data structure, maintained by storage server 108-A, at decision step 608, to determine whether there is a pending modify operation for the file handle corresponding to the write request. The pending operation table, in one embodiment, includes a filehandle for files which have a pending modify operation request. The pending operation table ensures that modify operations are serialized and performed in the order requested. "Modify operation" as used herein means an operation, other than a "write" operation, that modifies a file on the origin storage volume. An example of a modify operation is an operation to set the attributes of a file.

Referring back to FIG. 6, at decision step 608, if there is a pending modify operation for the file handle corresponding to the write request, then the write operation is suspended, step 606, until the pending modify operation is completed. If there is no pending modify operation, or the pending modify operations have completed, the storage server 108-A at step 610 adds an entry to the transaction log to indicate that the data has been written to the sparse volume cache. The transaction log is described below with reference to FIG. 7A.

Figure 7A:
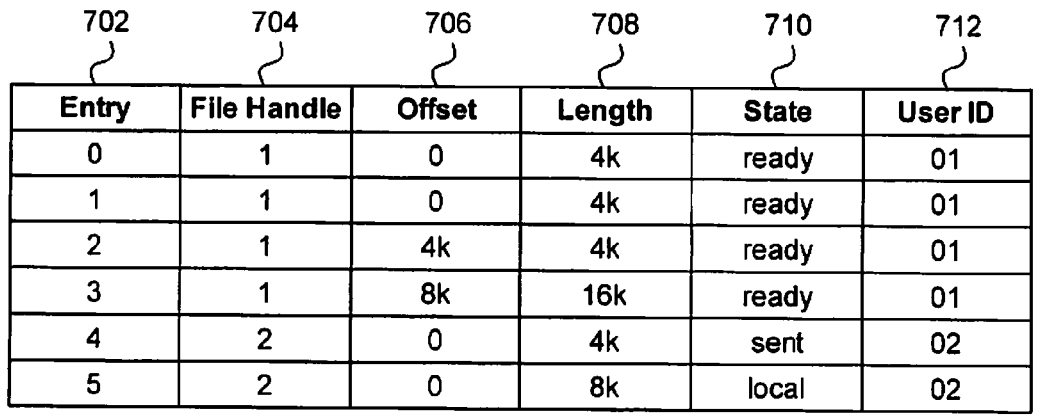
FIG. 7A is a table representing an example transaction log.

The example transaction log of FIG. 7A includes a plurality of entries 702. The transaction log stores information relating to data that has been written to the sparse volume. An entry includes information (metadata) relating to a file handle 704, an offset 706, a length 708, a state 710, and a user ID 712. It is noted that it is not necessary for a single table to include all of the information represented in the example transaction log of FIG. 7A, for example, one or more columns can be separated and stored in more than one table and can be linked to each other by, for example, the file handle and offset. Further, it is not necessary for the transaction log to be a "table" per se, as any data structure can perform the functions of the transaction log as described herein. In one embodiment, the transaction log is stored in memory 220. In another embodiment, the transaction log can be stored on the sparse volume, e.g., on disk 112-A. In yet another embodiment, the transaction log can be stored on the sparse volume, as well as in memory 220.

The file handle 704 associated with an entry is an indication of the file on the sparse volume and origin storage volume to which the write transaction relates. The file handle is a file identifier that can include, for example, the inode used to retrieve the file form disk. The offset 706 represents the starting location of the write request within the file. For example, entry 1 has an offset of 0, which means that the data associated with the write request is at the beginning of the file. Entry 3 in the transaction log, however, has an offset of 8 k, meaning that the write request starts with the block that is 8 k from the beginning of the file. The length 708 is the length of data to be written to the sparse volume.

State 710 represents the state of the data on the sparse volume. For example, entry 0 has a state "ready" which indicates that the data has been successfully written to the sparse volume and is ready to be written back or "flushed" to the origin storage volume. Entry 5 of the example transaction log has a state "local" which indicates that the data has not yet been successfully written to the sparse volume, but is in the process. Entry 4 of the example transaction log has a state of "sent", which indicates that the data is in the process of being written to the origin storage volume and an acknowledgement has not yet been received. User ID 712 is a unique ID for the user or application that requested the write operation.

The storage server 108-A at step 612 prepares to write the data to the sparse volume by fetching data blocks from the origin storage volume if there are absent blocks on the sparse volume or pre-filling the absent blocks that are part of the write request. Fetching or pre-filling data blocks from the origin storage volume maintains write alignment on the sparse volume. Storage server 108-A at step 614 writes the data to the sparse volume cache.

The storage server 108-A verifies that the data blocks have been successfully written to the sparse volume and sends an acknowledgement of a successful write to the client 104 at step 616. This process of writing the data to the sparse volume cache is transparent to the client 104. This means that while the data is written to the sparse volume cache, and has not yet necessarily been written to the origin storage volume, a request for the data by a client 104 is fulfilled by storage server 108-A as if the data is stored on the origin storage volume as well as on the sparse volume cache. Generally, the existence of the sparse volume is transparent to the client. This means that the client is unaware that the volume is sparse and it appears to the client that the data is being accessed from, or written to, a regular storage volume, e.g., the origin storage volume.

The data is stored on the sparse volume cache and the storage server 108-A waits, at decision step 618, for a defined event to trigger a write back, or "flush", to the origin storage volume. At step 620 a write command is sent to the origin storage volume. The defined trigger event can be, for example, a scheduled time or time interval or amount of used storage capacity on the sparse volume. One reason for regularly flushing data is that it can prevent large amounts of data being lost in the event of a failure of the sparse volume cache. In one embodiment, after the sparse volume has been flushed, a snapshot backup of the origin storage volume can be taken so that all of the write operations are reflected in the snapshot. In another embodiment, a defined event can be a remote update operation, for example modifying the attributes of a file. Because these remote update operations are stored not on the sparse volume cache but on the origin storage volume, the most recent user data that has been written to the sparse volume must be present at the origin storage volume when the modification takes place.

Other events can trigger a flush of writes stored in the sparse volume to the origin storage volume. For example, every time an entry is added to the transaction log, a flushing thread can be initiated, or awakened, on storage server 108-A to flush the data that has been written to the sparse volume to the origin storage volume. It should be noted that one method of triggering a flush of data to the origin storage volume need not be exclusive of other methods. For example, a storage server can flush data both on a defined interval and in response to an event. An example flush process is described in more detail below with reference to FIG. 8.

Figure 8:
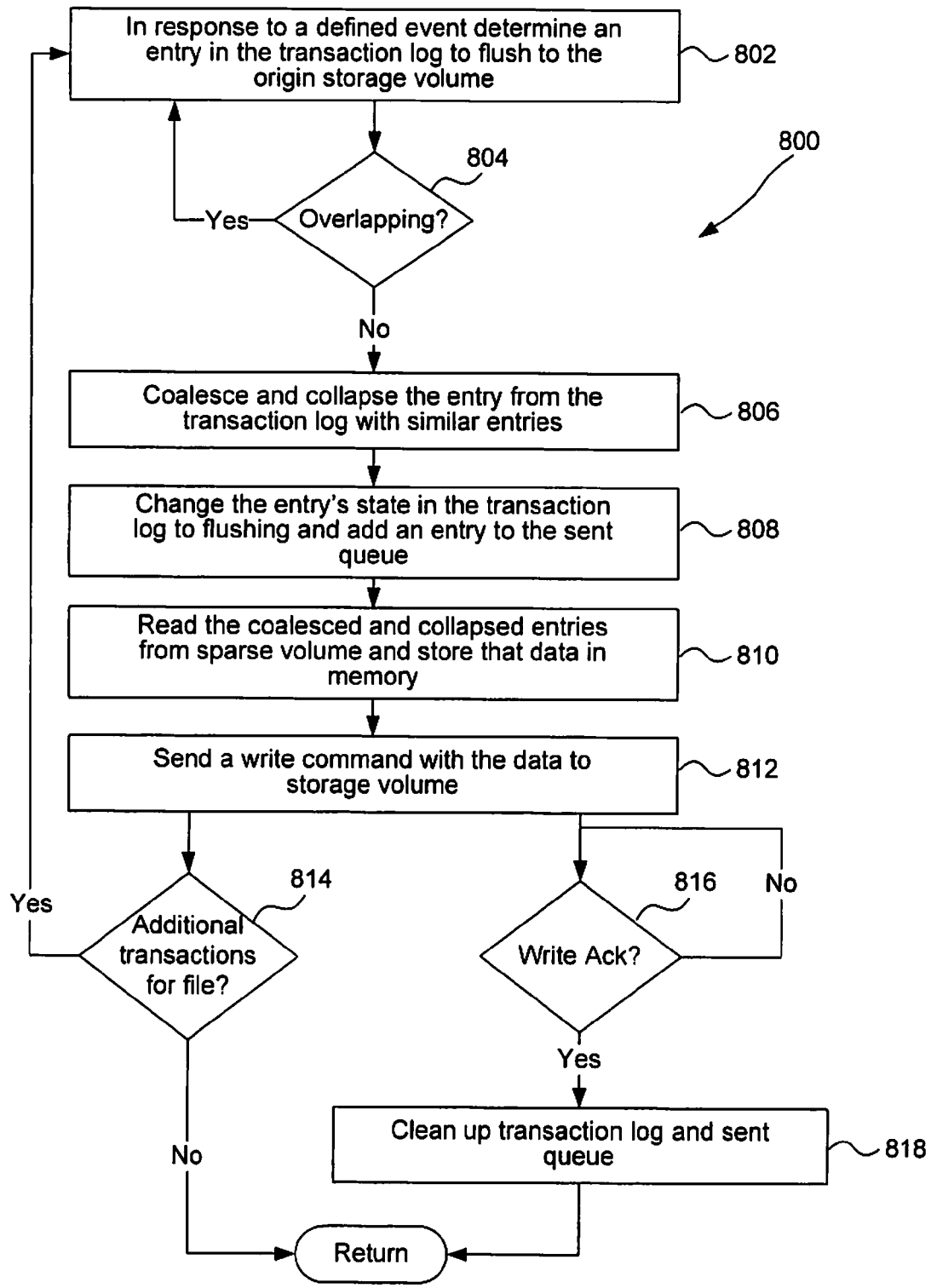
FIG. 8 is a flow diagram of a process for flushing data to an origin storage volume in a storage system that implements a sparse volume cache.

FIG. 8 is a flow diagram of a process 800 for flushing data to an origin storage volume in a storage server that implements a sparse volume cache. It should be understood that at least some of the operations associated with this process can potentially be reordered, supplemented, or substituted for, while still performing the same overall technique. In response to a defined event, at step 802, the storage server 108-A determines an entry in the transaction log to flush to the origin storage volume. For example, in one embodiment, the storage server 108-A steps through the transaction log to find a transaction that is marked with a state "ready". In one embodiment, where the flush was triggered for a specific file, the storage server 108-A checks the transaction log for the file handle of the specific file as well as whether the file is marked with the state "ready".

Figure 7B:
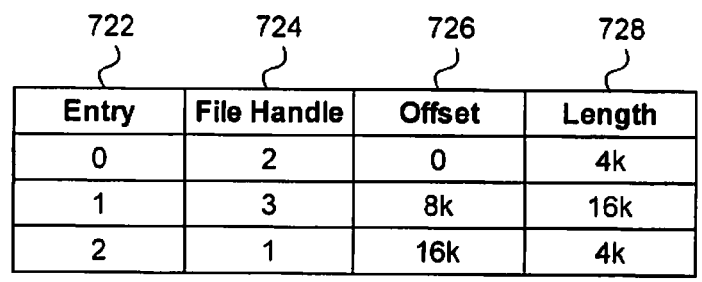
FIG. 7B is a table representing an example sent queue.

The storage server 108-A then, at decision step 804, verifies that no entry that overlaps with the entry to be flushed is found as a pending entry in a sent queue. FIG. 7B is a table representing an example sent queue. The sent queue is a list of flush transactions that are in the process of being flushed to the origin storage volume, i.e., the data has been sent to storage server 108-B and storage server 108-A has not yet received acknowledgement that the data has been written to the origin storage volume. The example sent queue of FIG. 7B includes an entry number 722, a file handle 724, an offset 726, and a length 728 for an entry. The sent queue, in one embodiment, is maintained by storage server 108-A and it is not necessary that the sent queue be stored as a "table" per se. The storage server 108-A uses the sent queue to enforce write ordering to the origin storage volume by verifying that previously sent data has been written to the origin storage volume before overlapping data is sent.

If the entry is overlapping with a pending entry in the sent queue, (i.e., the entry modifies a block within the range of blocks in the sent queue) the storage server 108-A skips the entry and returns to step 802 where it finds the next entry in the transaction log that is in a state ready to flush, i.e., marked with the "ready" state.

If the entry from the transaction log is not overlapping with a pending entry in the sent queue, the storage server 108-A, at step 806, attempts to coalesce and/or collapse the entry from the transaction log with similar entries that are ready to be flushed. Coalesce, as used herein, means to combine entries in the transaction log that have an offset range that overlaps, e.g., the offset starts or ends within the start or end of another entry, for a particular file handle, such that a single write operation is sent to the origin storage volume instead of multiple smaller write operations. Collapse, as used herein, means to replace an entry in the transaction log with a later entry that has an identical offset range, i.e., the later write modifies the same data blocks, such that a single write operation is sent to the origin storage volume with the most recently modified data.

Referring back to the example transaction log of FIG. 7A, suppose that the storage server 108-A has chosen entry 2 to flush to the origin storage volume. In this case the storage server 108-A can check the other entries to see if any can be coalesced or collapsed with entry 2. Entry 2 corresponds to block(s) of data corresponding with file handle 1 and starting at offset 4 k with a length of 4 k. Entry 3 in the transaction log corresponds to the next consecutive blocks of data corresponding to file handle 1 (offset 4 k). Thus, instead of sending two write operations to the origin storage volume, one of 4 k length and another of 16 k length, the storage server 108-A can coalesce the two entries into one write transaction that starts at offset 4 k and has a length of 20 k.

In another example, assuming that the storage server 108-A has chosen entry 0 to flush to the origin storage volume, the storage server 108-A can check the other entries to see if any can be coalesced or collapsed. Entry 0 corresponds to block(s) of data corresponding with file handle 1 starting at offset 0 with a length of 4 k. Entry 1 in the transaction log also corresponds to block(s) of data corresponding with file handle 1 and starting at offset 0 with length of 4 k. Because the two entries are for the same blocks of data, both modify the file associated with file handle 1, the storage server 108-A can clear the earlier entry from the transaction log and send a single write request to the origin storage volume with the data corresponding to entry 1 in the transaction log.

Referring back to FIG. 8, at step 808, the storage server 108-A changes the state of the entry in the transaction log to "sent" and adds an entry to the sent queue. Then, at step 810, the storage server 108-A reads the data corresponding to the coalesced and collapsed entries from the sparse volume cache and stores the data in memory. The storage server 108-A then, at step 812, sends a write request with the data to the origin storage volume. In one embodiment, the NRV protocol is used for the write request to the origin storage volume. In one embodiment, the write request is sent to the origin storage volume with super-user credentials.

After sending the write request, the storage server 108-A determines, at decision step 814, whether there are additional transactions in the transaction log with the same file handle as the previously flushed entry. If there is any additional entry for the same file, the process returns to step 802 and repeats until all entries for the file have been flushed to the origin storage volume.

At decision step 816, the storage server 108-A determines if a write acknowledgement has been received from the storage server 108-B which maintains the origin storage volume. If the storage server 108-A has not received a write acknowledgement from the storage server 108-B which maintains the origin storage volume, decision step 816-No, the storage server 108-A waits until one is received. In one embodiment, steps 816 and 818 are performed asynchronously from step 814 of the example process 800. In response to receiving a write acknowledgement from storage server 108-B, the storage server 108-A, at step 818, cleans up the transaction log and sent queue by clearing the entries corresponding to the data sent to the origin storage volume from the transaction log and the sent queue. While the data written to the sparse volume is now available from the origin storage volume, client applications continue to access the data from the sparse volume without having to fetch the data from the origin storage volume.

The techniques introduced above can be implemented by programmable circuitry programmed or configured by software and/or firmware, or they can be implemented entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims.

Accordingly, the specification and drawings are to be regarded in an illustrative sense rather than a restrictive sense.

The invention claimed is:

1. A method comprising:
receiving at a first storage server, from a first client, first data to be written to a storage volume on a second storage server, the second storage server communicably coupled with the first storage server;
caching the first data in a sparse volume of the first storage server and indicating to the first client a successful write in response to the first data being cached in the sparse volume, wherein the sparse volume is a further storage volume that appears to the first client to be a complete replication of the storage volume, but does not contain all data from the storage volume;
maintaining client access to the first data in the sparse volume of the first storage server such that the existence of the sparse volume is transparent to the first client; and
sending the first data to the second storage server to be written to the storage volume.

2. The method of claim 1, wherein indicating to the first client a successful write includes sending an acknowledgement without first writing the first data to the storage volume on the second storage server.

3. The method of claim 1, further comprising:
maintaining a data structure on the first storage server; and
adding a first entry to the data structure on the first storage server representing the first data written to the sparse volume, wherein the data structure is a record of data to be written to the storage volume.

4. The method of claim 3, further comprising coalescing entries in the data structure; and
sending a single write operation for a consecutive range of data blocks represented in the data structure to the second storage server.

5. The method of claim 4, wherein coalescing entries in the data structure includes:
scanning the data structure for a second entry that modifies blocks adjacent to blocks corresponding to the first data; and
combining the second entry with the first entry and removing the second entry from the data structure.

6. The method of claim 3, further comprising collapsing entries in the data structure; and
sending a single write operation for multiple writes modifying a single set of data represented in the data structure to the second storage server.

7. The method of claim 6, wherein collapsing entries in the data structure includes:
scanning the data structure for a second entry that modifies blocks corresponding to the first data; and
removing the second entry from the data structure.

8. The method of claim 3, further comprising:
stalling new write requests on a defined interval;
flushing all entries in the data structure to the storage volume; and
initiating a backup of the storage volume.

9. The method of claim 1, further comprising providing a second client with access to the first data to be written to the storage volume, on the sparse volume, such that the existence of the sparse volume is transparent to the second client.

10. The method of claim 1, further comprising:
determining if there is a pending operation affecting a file associated with the first data; and
in response to determining that there is a pending operation, suspending caching the first data to the sparse volume of the first storage server until the pending operation is completed.

11. The method of claim 1, wherein sending the first data to the second storage server is in response to receiving at the first storage server, from a second client, second data to be written to the storage volume that overlaps with the first data.

12. The method of claim 1, wherein maintaining the client access to the first data in the sparse volume includes maintaining the client access for the first client.

13. A method comprising:
receiving at a first storage server, from a client, a first set of data to be written to a volume located on a second storage server, wherein the first storage server is connected to the second storage server through a network and the first storage server includes a sparse volume cache of the volume located on the second storage server; writing the first set of data to the sparse volume cache on the first storage server, wherein the sparse volume cache is a further storage volume that appears to the client to be a complete replication of the volume of the second storage server, but does not contain all data from the volume of the second storage server;
adding a first entry to a data structure on the first storage server, the data structure representing the data written to the sparse volume cache, wherein the data structure is a record of data to be written to the storage volume;
indicating a successful write to the client without first writing the first set of data to the volume located on the second storage server, wherein the presence of the first set of data in the sparse volume cache is transparent to the client; and
sending the data represented in the data structure from the sparse volume cache to the volume located on the second storage server.

14. The method of claim 13, further comprising:
receiving at the first storage server, from the client, a second set of data to be written to the volume on the second storage server, wherein the second set of data is received before the first set of data is sent to the second storage server and the second set of data has an offset range that overlaps with the first set of data;
coalescing entries in the data structure; and
sending a single write operation for a consecutive range of data blocks represented in the data structure to the second storage server.

15. The method of claim 14, wherein coalescing entries in the data structure includes:
scanning the data structure for a second entry corresponding to the second set of data; and
combining the second entry with the first entry and removing the second entry from the data structure.

16. The method of claim 13, further comprising:
receiving at the first storage server, from the client, a second set of data to be written to the volume on the second storage server, wherein the second set of data is received before the first set of data is sent to the second storage server and the second set of data modifies the first set of data;
collapsing entries in the data structure; and
sending a single write operation for multiple writes modifying a single set of data represented in the data structure to the second storage server.

17. The method of claim 16, wherein collapsing entries in the data structure includes:

scanning the data structure for a second entry corresponding to the second set of data; and
removing the first entry from the data structure.

18. The method of claim 13, further comprising providing access for a second client to the sparse volume cache storing the first set of data such that the existence of the sparse volume is transparent to the second client.

19. A storage server comprising:
a processor;
a memory coupled with the processor;
a network adapter configured to allow the storage server to access a second storage server through a network, the second storage server including a storage volume; and
a sparse volume cache of the storage volume, the sparse volume cache configured to receive, from a client, data to be written to the storage volume on the second storage server, wherein in operation, the storage server writes the data to be written to the storage volume, to the sparse volume cache, and sends to the client an indication of a successful write in response to the data being written to the sparse volume cache;
wherein the sparse volume cache is a further storage volume that appears to the client to be a complete replication of the storage volume, but does not contain all data from the storage volume.

20. The storage server of claim 19, further comprising a data structure including entries representing the data written to the sparse volume cache, wherein the data structure is a record of data to be written to the storage volume.

21. The storage server of claim 20, wherein the storage server is configured to send the data represented in the data structure from the sparse volume cache to the storage volume of the second storage server.

22. The storage server of claim 21, wherein the storage server is further configured to coalesce entries in the data structure and send a single write operation for a consecutive range of data blocks to the second storage server.

23. The storage server of claim 21, wherein the storage server is further configured to collapse entries in the data structure and send a single write operation for multiple writes modifying a single data block to the second storage server.

24. The storage server of claim 19, wherein the existence of the sparse volume cache is transparent to the client.

25. The storage server of claim 19, wherein the storage server is configured to provide access to the data written by a first client to the sparse volume cache to a second client such that the presence of the data in the sparse volume cache is transparent to the second client.

26. The storage server of claim 19, further comprising a sent queue configured to maintain write ordering to the storage volume on the second storage server.

27. A storage server comprising;
an interface through which to connect the storage server to communicate with a second storage server, the second storage server including a storage volume;
a sparse volume cache of the storage volume, wherein the sparse volume cache is a further storage volume that appears to a client to be a complete replication of the storage volume, but does not contain all data from the storage volume;
a processor; and
a memory coupled with the processor, the memory storing instructions which when executed by the processor cause the storage server to perform a plurality of operations, including:
receiving, from the client, data to be written to the storage volume; writing the data from the client to the sparse volume cache;
adding an entry to a data structure stored on the sparse volume cache, the entry representing the data written to the sparse volume cache, wherein the data structure is a record of data to be written to the storage volume;
indicating to the client, in response to the data from the client being written to the sparse volume cache, that the data from the client has been written to the storage volume, wherein the presence of the data from the client in the sparse volume cache is transparent to the client; and
sending the data from the sparse volume cache to the second storage server to be written to the storage volume.

28. The storage server of claim 27, wherein the instructions when executed by the processor further cause the storage server to perform an operation of coalescing entries in the data structure; and
sending a single write operation for a consecutive range of data blocks represented in the data structure to the second storage server.

29. The storage server of claim 27, wherein the instructions when executed by the processor further cause the storage server to perform an operation of collapsing entries in the data structure; and
sending a single write operation for multiple writes modifying a single data block to the second storage server.

30. The storage server of claim 27, wherein the instructions when executed by the processor further cause the storage server to perform an operation of providing access to the data written to the sparse volume cache to a second client in response to a request from the second client to access the data on the storage volume, wherein the presence of the data from the client in the sparse volume cache is transparent to the second client.

* * * * *

UNITED STATES PATENT AND TRADEMARK OFFICE
CERTIFICATE OF CORRECTION

| | | |
|---|---|---|
| PATENT NO. | : 8,601,214 B1 | Page 1 of 1 |
| APPLICATION NO. | : 12/986050 | |
| DATED | : December 3, 2013 | |
| INVENTOR(S) | : Mardiros Z. Chakalian et al. | |

It is certified that error appears in the above-identified patent and that said Letters Patent is hereby corrected as shown below:

In the Specifications

In column 6, line 56, delete "PVBN-WBN" and insert -- PVBN-VVBN --, therefor.

In column 6, line 58, delete "PVBN-WBN" and insert -- PVBN-VVBN --, therefor.

In column 6, line 64, delete "PVBN-WBN" and insert -- PVBN-VVBN --, therefor.

Signed and Sealed this
Fifteenth Day of April, 2014

Michelle K. Lee
*Deputy Director of the United States Patent and Trademark Office*